Nov. 8, 1966

L. BECKER 3,284,718

BUFFER-STAGE CIRCUIT

Filed Dec. 9, 1963

INVENTOR
LEO BECKER

BY [signature]

ATTORNEY 3,284,718
Patented Nov. 8, 1966

3,284,718
BUFFER-STAGE CIRCUIT

Leo Becker, Ludwigsburg, Germany, assignor to International Standard Electric Corporation, New York, N.Y., a corporation of Delaware Filed Dec. 9, 1963, Ser. No. 328,987
Claims priority, application Germany, Dec. 19, 1962, St 20,099
1 Claim. (Cl. 330—12)

The invention relates to transistorized buffer-stage circuits and more particularly to circuits for correcting the input and/or output impedances of series-connected reactive circuit configurations.

Some circuits, such as filters and equalizers, have complex, reactive input and output impedances. If now two such networks are series-connected, the first one is terminated with the complex, reactive input impedance of the second network. However, the input impedance for the second configuration is also reactive and complex. From this reciprocation results, and the operation attenuation of the connection is deficient because it deviates from the sum of attenuations of the individual circuit configurations.

In principle, this deficiency can be eliminated in that constant impedance (sometimes called constant-Z) circuit configurations or networks are used. But such networks need about double the quantity of elements as compared with the complex reactive input and output impedance. If, however, such a constant-Z network is made variable, two mutual dual modifications in the network are necessary. These modifications make the variation operation difficult.

It is now known that an amplifier-stage may be used to decouple the two series-connected networks. This has the disadvantage that in case an amplifying element fails the entire line of circuits is completely interrupted. Furthermore, when used in telephone systems, such amplifiers must meet the high requirements of carrier frequency engineering, and a spare amplifier must be provided for each amplifier-stage.

An object of the invention is to provide new and improved buffer-stage circuits. A more particular object is to provide transistorized circuits for correcting the input and output impedance of any networks. Yet another object is to provide buffer means for completing series-connections of reactive networks which avoid the disadvantages of known arrangements.

According to one aspect of the invention, the circuit arrangement for a buffer-stage is designed with an amplifying element in a shunt-branch. In parallel with the input terminals of the arrangement is a voltage divider having a tap connected to the control electrode of the amplifying element. With regard to the A.C. path, the grounded and output electrodes of the amplifying elements are connected to the output terminals. Furthermore, a resistor is inserted in the series-branch of the circuit between the voltage divider and the grounded electrode so that at a low output impedance a constant input impedance is obtained, independent from the load.

Figure 1:
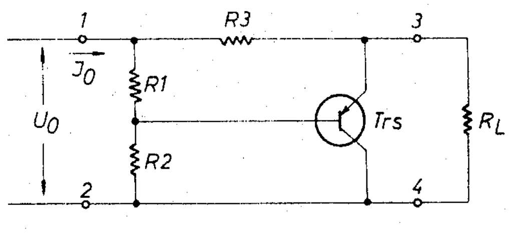
Figure 2:
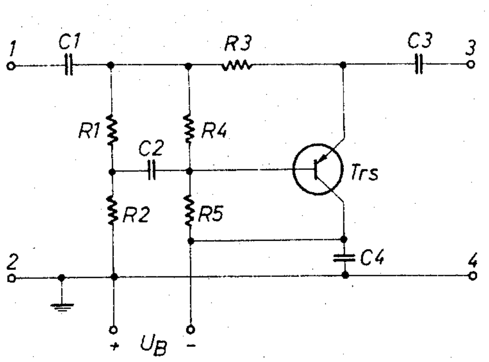

The above mentioned and other features of this invention and the manner of obtaining them will become more apparent, and the invention itself will be best understood by reference to the following description of an embodiment of the invention taken in conjunction with the accompanying drawings, in which:

FIG. 1 is a circuit diagram of the A.C. portion of a circuit arrangement made according to the invention; and FIG. 2 shows an example of such an arrangement with a D.C. supply added.

FIG. 1 shows a circuit diagram of an arrangement made according to the invention. All elements which solely serve for supplying D.C. potentials to the electrodes of the transistor *Trs* are omitted. The input terminals are shown at 1 and 2, and the output terminals are shown at 3 and 4. The terminals 1, 2 are output terminals for a preceding circuit. The terminals 3, 4 are input terminals for a succeeding circuit. The circuit of FIG. 1 is a buffer between the preceding and succeeding circuits.

In parallel with the input terminals 1 and 2 is a voltage divider consisting of the resistors R1 and R2. The tap or interconnecting point of the voltage divider is connected with the base of the transistor *Trs*. The transistor's emitter is connected to the output terminal 3, and its collector to the output terminal 4. A resistor R3 is inserted in the circuit between the input terminal 1 and the emitter of the transistor. The load is shown by a symbolic resistor designated RL which is connected across the output terminals 3, 4.

It is common practice to lump transistor circuits into one of three categories as: common emitter, common base, or common collector (emitter follower). Those who like to do this will find some difficulty in classifying the invention as a stereotyped configuration because it is not a stereotype circuit. The signal currents pass from terminal 1 to terminal 3 and from terminal 2 to terminal 4 without necessarily going thorugh the transistor *Trs*. Both the collector and the emitter are common to input and output terminals. Therefore, the circuit could be called either common emitter or common collector. On the other hand, an engineer who is starting fresh to design this buffer stage would very likely start with a common collector configuration. Therefore, there may be some reason for leaning toward the term "common collector" if the circuit must be described as one of the three configurations.

The object of the invention is to keep a constant impedance between the points 1 and 2 if the load resistor RL changes its impedance value within a wide range. The term "constant input impedance" means that with a varying input voltage $U_0$, the input current $J_0$ changes in compliance with the instantaneous value of the voltage $U_0$.

In a transistor the emitter current is made larger by current amplification. In greater detail, the base current is multiplied by the coefficient $\beta$ to become an emitter-collector current which is usually between 10 and 100 times larger. The collector circuit has a high input impedance as compared with the resistors $R_1$ and $R_2$ which are located in parallel therewith. Thus, the base input impedance can be neglected when compared with this collector impedance. Also, the base input current may be neglected as compared with the current flowing through the voltage divider $R_1$ and $R_2$. Therefore, for the A.C. voltage at the resistor $R_3$:

$$U_1=U_3+U_{EB}$$

where $U_1$ represents the alternate voltage across the resistor $R_1$; $U_3$ represents the alternate voltage across the resistor $R_3$; and $U_{EB}$ represents the alternate voltage measure between the base and emitter of the transistor. From this, we derive the following results for the currents J:

$$J_3 \cdot R_3+U_{EB}=J_1R_1$$

Since the A.C. voltage measured between the base and emitter of the transistor *Trs* is small and negligible, one can insert:

$$U_1=U_3$$

and $$J_1 \cdot R_1=J_3 \cdot R_3$$

Since the voltage $U_1$ varies directly in proportion to the input voltage $U_0$ the voltage $U_3$ has the same value.

That is, the current $J_0=J_1+J_3$ and varies directly in proportion to the input voltage $U_0$. The result is that the input impedance is constant and real.

The collector has a very low output impedance and produces a voltage amplification of about 1. Due to the voltage divider $R_1$, $R_2$, only a part of the input voltage operates as control voltage. Thus, a constant voltage attenuation is obtained between the terminals 1, 2 and 3, 4.

FIG. 1 does not consider the D.C. supply of the transistor T*rs*. Thus, FIG. 2 is given to represent a practicable design of an arrangement containing the D.C. bias components which are not necessary for an understanding of FIG. 1. The base or control electrode of the transistor T*rs* receives its D.C. bias via a voltage divider comprising the resistors $R_4$, $R_5$. These resistors $R_4$, $R_5$ are in parallel with the resistors $R_1$ and $R_2$, respectively, with regard to the A.C. path. The resistors $R_3$, $R_1$, and $R_2$ are series-connected in the emitter circuit of the transistor T*rs* with regard to the D.C. path.

The capacitors $C_1$–$C_4$ serve only to separate the D.C. paths, and their capacity values should be kept to such values that they do not play any part with regard to the A.C. path.

In one exemplary form, the design of the circuit arrangement according to the invention, represented in FIG. 2, is realized with the following values of the components. All capacitors have the capacity value of 32 $\mu f$. The resistor $R_1=780\Omega$, $R_2=1.4k\Omega$, $R_3=250\Omega$, $R_4=2.5k\Omega$, $R_5=24k\Omega$.

As a supply voltage $U_B$ of 24 volts, the arrangement has an input impedance of 600Ω and a voltage attenuation of about 3 db.

It is self-evident, that other modifications may also be used for the supply of the electrodes. For example, the control electrode can be biased via a voltage divider $R_4'$ and $R_5'$, which is directly above the supply voltage $U_B$.

While the principles of the invention have been described above in connection with specific apparatus and applications, it is to be understood that this description is made only by way of example and not as a limitation on the scope of the invention.

What is claimed is:

A transistor buffer-stage for interconnecting a pair of output terminals of a first network and a pair of input terminals of a second network;

said output terminals of the first network presenting an impedance different than the impedance of the input terminals of the second network;

said buffer stage including a first shunt-arm connected across said output terminals, a second shunt-arm connected across said input terminals and a series-arm connected between an input terminal and an output terminal;

a transistor having a control electrode and two controlled electrodes functioning as an amplifier element;

means connecting said two controlled electrodes of the transistor in series into said second shunt-arm;

an A.C. input signal divider connected serially into the first shunt-arm;

said A.C. input signal divider including a tap for electrical connections;

means connecting the tap to the control electrode of the transistor through means for coupling only A.C. input signals;

means coupling one of said controlled electrodes to ground through means for coupling only A.C. signals;

a resistor inserted between the center tap of said A.C. input signal divider and the grounded one of said controlled electrodes for assuring a low buffer-stage output impedance and a constant buffer-stage input impedance independent of load impedance; and means connected to supply direct current biasing potentials to the electrodes of the transistor.

References Cited by the Examiner

UNITED STATES PATENTS

| | | | |
|---|---|---|---|
| 2,873,387 | 2/1959 | Kidd. | |
| 2,983,875 | 5/1961 | Zechter | 330—32 XR |
| 3,079,566 | 2/1963 | Ebbinge | 330—22 XR |
| 3,210,566 | 10/1965 | Rainer | 330—31 XR |
| 3,215,851 | 11/1965 | Warnock. | |

FOREIGN PATENTS

| | | |
|---|---|---|
| 852,746 | 11/1960 | Great Britain. |
| 869,581 | 5/1961 | Great Britain. |
| 928,256 | 6/1963 | Great Britain. |

ROY LAKE, *Primary Examiner.*

F. D. PARIS, N. KAUFMAN, *Assistant Examiner.*